(12) United States Patent
Hsieh

(10) Patent No.: US 8,292,040 B2
(45) Date of Patent: Oct. 23, 2012

(54) DOUBLE SCREW ELEVATOR

(75) Inventor: Wu-Teng Hsieh, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 465 days.

(21) Appl. No.: 12/648,723

(22) Filed: Dec. 29, 2009

(65) Prior Publication Data

US 2011/0155509 A1   Jun. 30, 2011

(51) Int. Cl.
 *B66B 9/02* (2006.01)
(52) U.S. Cl. ............ 187/267; 187/268; 254/98; 254/103
(58) Field of Classification Search .................. 187/267, 187/268; 254/98, 103
See application file for complete search history.

(56) References Cited

U.S. PATENT DOCUMENTS

| | | | | |
|---|---|---|---|---|
| 1,563,792 A | * | 12/1925 | Rickard | 187/267 |
| 3,468,401 A | * | 9/1969 | Letz | 187/268 |
| 3,881,575 A | * | 5/1975 | Manaugh | 187/268 |
| 3,935,600 A | * | 2/1976 | Scribner | 4/495 |
| 4,287,967 A | * | 9/1981 | Perkins | 187/268 |
| 4,742,891 A | * | 5/1988 | Kunii et al. | 187/267 |
| 4,768,621 A | * | 9/1988 | Kunii | 187/268 |
| 5,938,382 A | * | 8/1999 | Andre et al. | 410/24 |
| 6,769,322 B2 | * | 8/2004 | Lin | 74/89.23 |
| 7,712,389 B2 | * | 5/2010 | Wang | 74/89.23 |
| 2007/0295126 A1 | * | 12/2007 | Wang | 74/89.35 |

FOREIGN PATENT DOCUMENTS

TW   543649   7/2003

* cited by examiner

*Primary Examiner* — Michael Mansen
*Assistant Examiner* — Michael Riegelman

(57) ABSTRACT

A double screw elevator consists of two screws whose helical threads extend in opposite helical directions, and each of the screws is provided with a nut, so that a suspension unit and a carrying unit on the nuts can be driven to move close to or away from each other, thus achieving the function of lifting or lowering the elevator car. The double screw elevator is simply structured, easy to assemble, and the length of a single screw of the elevator is shortened, making it easier to manufacture the screw. Furthermore, the screw driving elevator reduces the occurrence of accident whiling improving the rate of utilization.

7 Claims, 5 Drawing Sheets

DOUBLE SCREW ELEVATOR

BACKGROUND OF THE INVENTION

1. Field of the Invention

The present invention relates to an elevator, and more particularly to a double screw elevator.

2. Description of the Prior Art

Nowadays, elevators have become indispensible to our daily life, and most of the conventional elevators are driven by steel rope. However, the steel rope elevators require frequent and regular maintenance, otherwise, the steel rope may break, causing injury or death.

Another screw type elevator 10, for example the one disclosed in TW Pt 543649, as shown in FIG. 1, comprises a fixed screw assembly 11, a relay screw assembly 12 and an elevator-car screw assembly 13 which are connected in series and are electrically connected with and driven by a power source 111, 121, 131, respectively. The elevator-car screw assembly 13 is driven by the power source to make the elevator car 14 move linearly. The screw driving method reduces the occurrence of accident, and the serially-connected screw assemblies reduce the required length of a single screw, and thus making it easier to manufacturing the screw. However, the screw assemblies each require a power source and are then connected in series, which complicates the structure and assembly of the elevator.

The present invention has arisen to mitigate and/or obviate the afore-described disadvantages.

SUMMARY OF THE INVENTION

The primary object of the present invention is to provide a simply structure double screw elevator which is easy to manufacture and can improve rate of utilization.

To achieve the above object, a double screw elevator in accordance with the present invention comprises: a double screw driving unit, a limit rail, a carrying unit, an elevator car, a suspension unit and an assembling device.

The double screw driving unit includes a driving shaft assembly connected to a rotation power source, the driving shaft assembly is provided on an outer surface thereof with a first helical thread and a second helical thread in such a manner that the first helical thread and the second helical thread extend in opposite helical directions, the rotation power source is connected to the driving shaft assembly for driving the driving shaft assembly to rotate.

The limit rail is disposed in parallel to the driving shaft assembly.

The carrying unit includes a nut fixed to one side of a carrying seat, the nut is screwed with the first thread, while another side of the carrying is slidably received in the limit rail.

The elevator car is detachably disposed on the carrying seat of the carrying unit.

The suspension unit includes a nut fixed to one side of a suspension rack, the nut of the suspension unit is screwed with the second thread, and another side of the suspension rack is slidably received in the limit rail. The assembling device is used to connect the elevator car to the suspension rack. The double screw elevator in accordance with the present invention is simply structured, easy to assemble, and the length of a single screw of the elevator is shortened, making it easier to manufacture the screw. Furthermore, the screw driving elevator reduces the occurrence of accident whiling improving the rate of utilization.

DETAILED DESCRIPTION OF THE PREFERRED EMBODIMENTS

Figure 1:
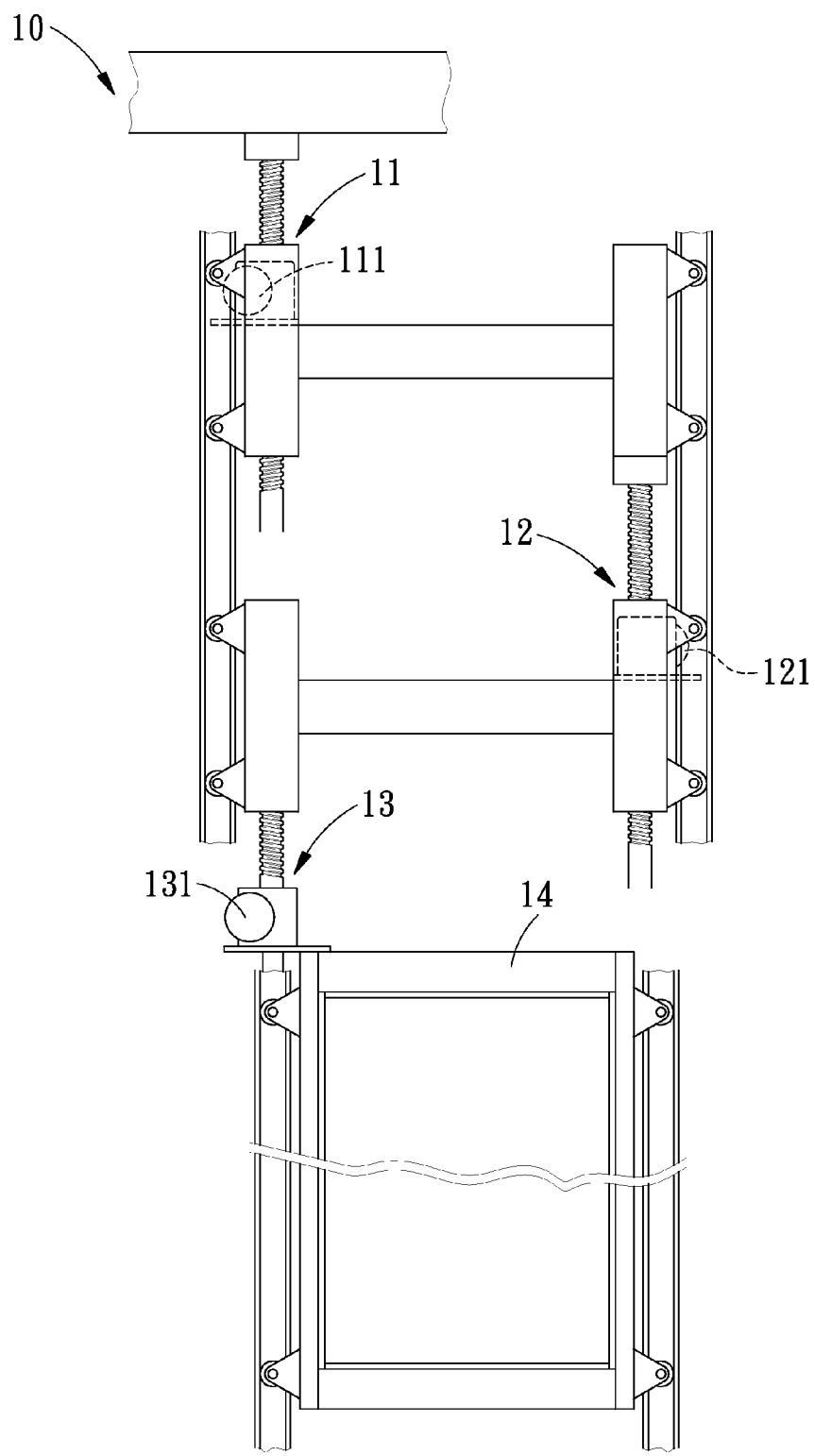
FIG. 1 is an illustrative view of a conventional elevator.

The present invention will be clearer from the following description when viewed together with the accompanying drawings, which show, for purpose of illustrations only, the preferred embodiment in accordance with the present invention.

Referring to FIGS. 2-5, a double screw elevator in accordance with a preferred embodiment of the present invention comprises: a double screw driving unit 20, a limit rail 30, a carrying unit 40, an elevator car 50, a suspension unit 60 and an assembling device 70.

The double screw driving unit 20 includes a driving shaft assembly connected to a rotation power source 21. The driving shaft assembly includes a first screw 22, a second screw 23 and a connecting rod 24 which are connected to one another. The first screw 22 and the second screw 23 are formed on their outer surfaces with a first helical thread 221 and a second helical thread 231, respectively, in such a manner that the first helical thread 221 of the first screw 22 and the second helical thread 231 of the second screw 23 extend in opposite helical directions. The connecting rod 24 is located between the first and second screws 22, 23 to connect the two screws together. The rotation power source 21 is connected to one end of the driving shaft assembly, and in this embodiment, the rotation power source 21 is connected to one end of the first screw 22, so that it can drive the driving shaft assembly to rotate.

The limit rail 30 is disposed in parallel to the driving shaft assembly of the double screw driving unit 20.

The carrying unit 40 includes a nut 41 and a carrying seat 42. The nut 41 is screwed with the first helical thread 221 of the first screw 22, while the carrying seat 42 is fixed to the nut 41. A limit member 421 is disposed at one side of the carrying seat 42 and slidably received in the limit rail 30, and the limit member 421 in this embodiment is a roller.

The elevator car 50 includes a receiving space 51 and is disposed on the carrying seat 42 of the carrying unit 40.

The suspension unit 60 includes a nut 61 and a suspension rack 62. The nut 61 is screwed with the second helical thread 231 of the second screw 23, and the suspension rack 62 is fixed on the nut 61. A limit member 621 is disposed at one side of the suspension rack 62 and slidably received in the limit rail 30, and the limit member 621 in this embodiment is a roller.

The assembling device 70 includes an upper assembling member 71, a lower assembling member 72 and a power source assembly. The upper assembling member 71 is fixed to the suspension rack 62, and the lower assembling member 72 is fixed to the elevator car 50. The power source assembly includes a power source 73 and an assembling portion 74. The power source 73 includes a retractable central shaft 731 with one end to be connected to the assembling portion 74. The assembling portion 74 includes a first shaft 741 and a second shaft 742. The upper assembling member 71 is formed with a first inserting hole 711 for insertion of the first shaft 741, while the lower assembling member 72 is located under the upper assembling member 71 and formed with a second inserting hole 721 for insertion of the second shaft 742. The power source 73 is capable of pushing the central shaft 731 to an extended position or retracting the central shaft 731 to a retracted position, when the central shaft 731 is pushed to an extended position, making the first shaft 741 and the second shaft 742 will insert into the first and second inserting holes 711, 721, respectively, so as to connect the elevator car 50 to the suspension rack 62.

Figure 2:
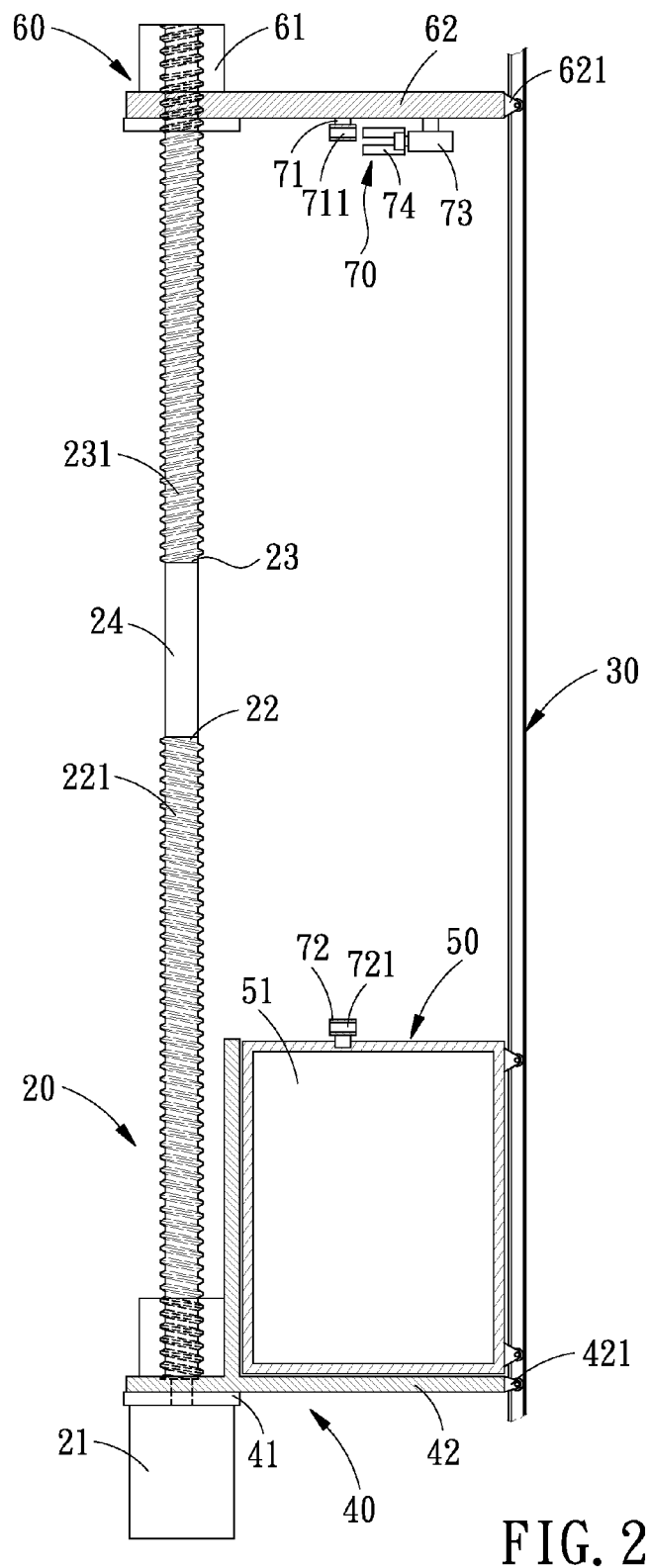
FIG. 2 shows that the elevator car in accordance with a double screw elevator of the present invention is located at the lowest position on the driving shaft assembly.

For a better understanding of the present invention, reference should be made to FIG. 2, which shows that the elevator car 50 and the carrying unit 40 are located at the lowest position on the driving shaft assembly, while the suspension unit 60 is located at the top position on the driving shaft assembly. To make the elevator car 50 move upward, the rotation power source 21 drives the driving shaft assembly to rotate. Since the nuts 41 and 61 of the carrying unit 40 and the suspension unit 60 are screwed on the first and second screws 22, 23, and the limit rail 30 restricts the carrying unit 40 and the suspension unit 60 to move linearly along the limit rail 30 without rotation, so that when the driving shaft assembly rotates, the nuts 41 and 61 will convert the rotation power into a linear motion power, making the nuts 41 and 61 drive the carrying seat 42 and the suspension rack 62 to move linearly along the first and second screws 22, 23.

Figure 3:
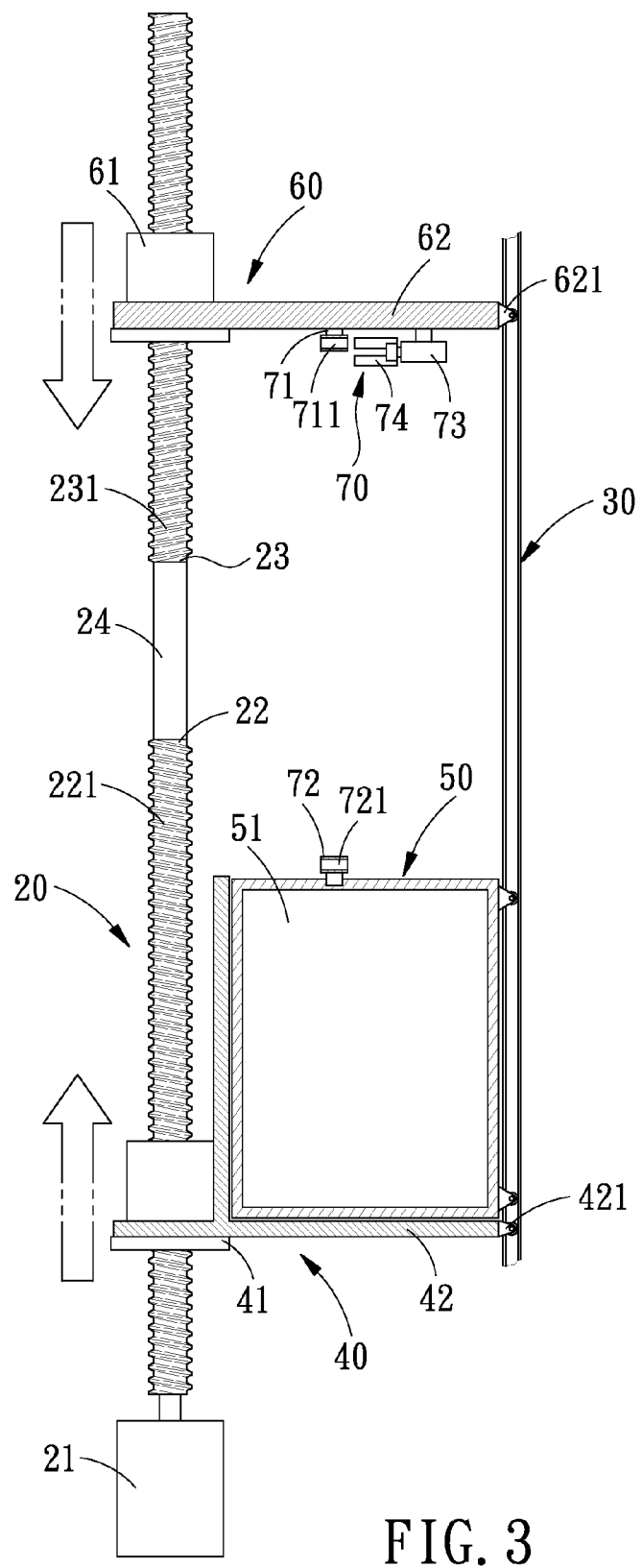
FIG. 3 is operational view showing that the carrying unit and the suspension unit in accordance with the double screw elevator of the present invention are moving close to each other.
Figure 4:
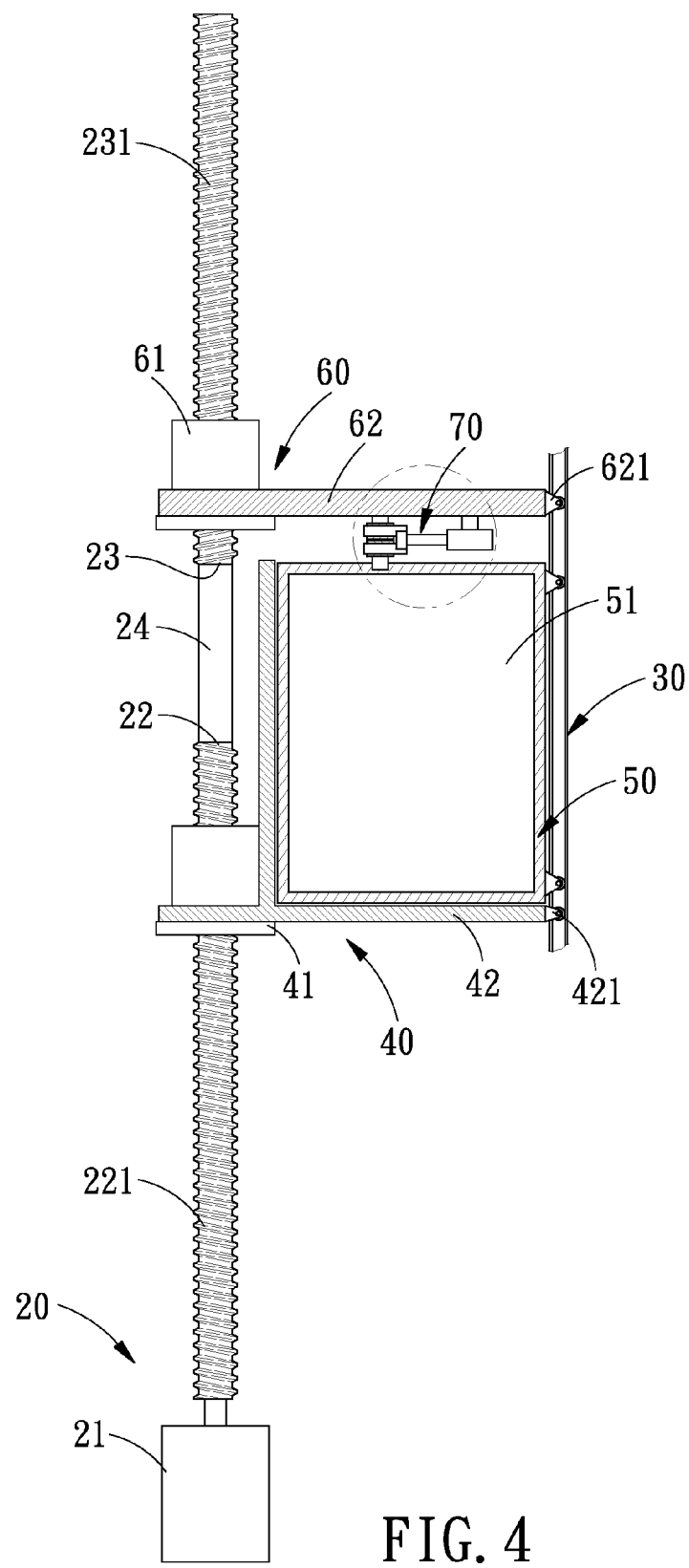
FIG. 4 is an illustrative view showing that the carrying unit in accordance with the double screw elevator of the present invention moves to the top of the first screw and combined to the assembling device.
Figure 5:
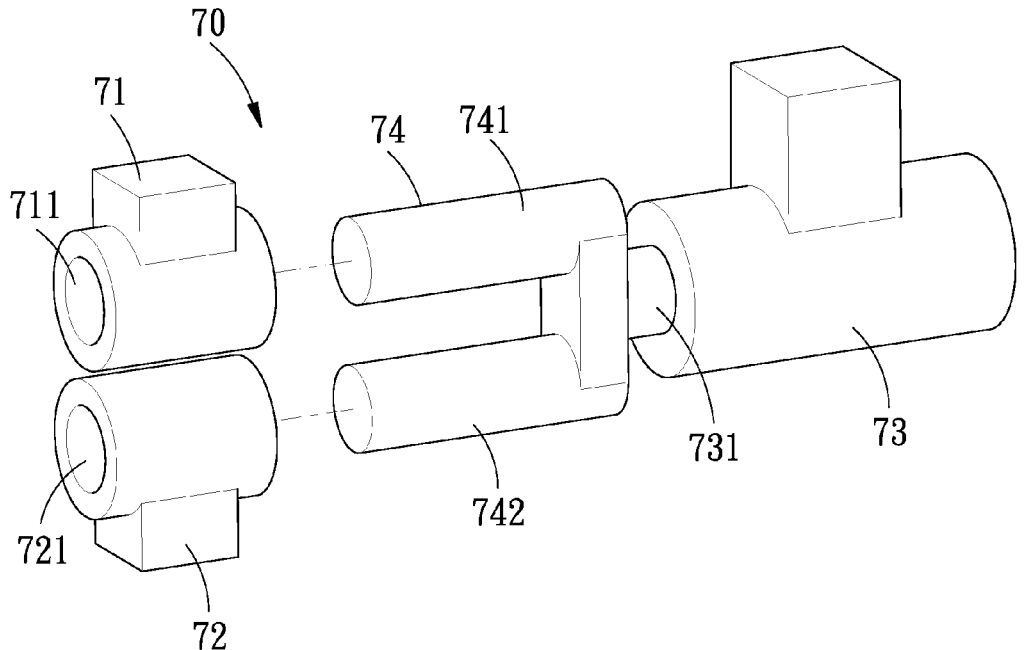
FIG. 5 is a perspective view of the assembling device of FIG. 4.

Referring then to FIGS. 3-5, when the rotation power source 21 drives the driving shaft assembly to rotate, the nut 41 of the carrying unit 40 will be driven to move linearly along the first screw 22, and the nut 41 of the carrying unit 40 will move toward the suspension unit 60, meanwhile, the nut 61 of the suspension unit 60 will be caused to move linearly along the second screw 23, and the nut 61 of the suspension unit 60 will also move toward the carrying unit 40. As a result, the carrying unit 40 moves upward from the lowest position to the top of the first screw 22 while the suspension unit 60 moves downward from the top position to the bottom of the second screw 23, bringing the upper assembling member 71 and the lower assembling member 72 of the assembling device 70 into contact with each other. When the upper assembling member 71 and the lower assembling member 72 of the assembling device 70 contact each other, the power source 73 of the assembling device 70 will pushes out the central shaft 731 into an extended position, making the first shaft 741 and the second shaft 742 of the assembling portion 74 at the free end of the central shaft 731 insert into the first and second inserting holes 711, 721 of the upper assembling member 71 and the lower assembling member 72, respectively, and thus the elevator car 50 is fixed to the assembling device 70 on the suspension unit 60. The power source 73 of the assembling device 70 can be controlled by a built-in sensor or an external controller.

If the rotation power source 21 is controlled to produced a reverse rotation power, and the first and second screws 22, 23 are driven to rotate in a reverse direction, the carrying unit 40 and the suspension unit 60 will be moved away from each other, namely, the carrying unit 40 will moves toward the bottom of lower end of the first screw 22, and the suspension unit 60 moves toward the top of the second screw 23. Since the elevator car 50 has been fixed to the suspension unit 60 by the assembling device 70, the suspension unit 60 can drive the elevator car 50 to move upward, and thus the elevator car 50 is lifted.

Figure 6:
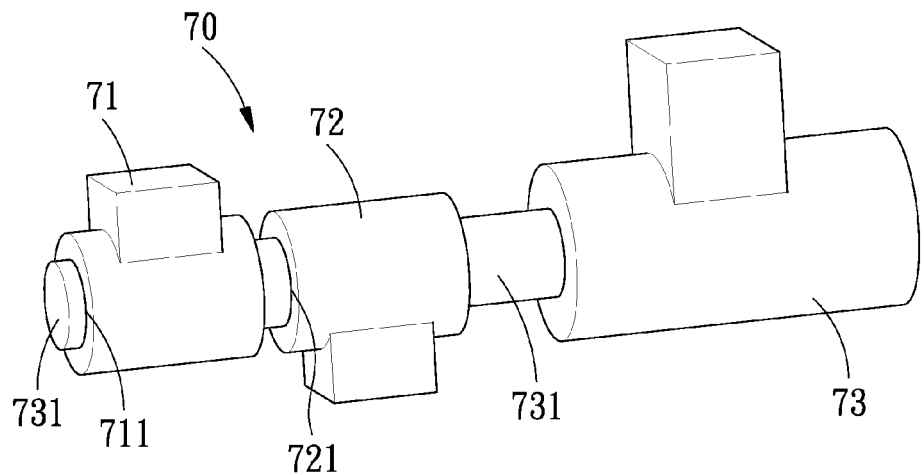
FIG. 6 shows another embodiment of the assembling device in accordance with the present invention.

Referring then to FIG. 6, which shows another embodiment of the assembling device 70 in accordance with the present invention, wherein the upper assembling member 71 is fixed to the suspension rack 62, and the lower assembling member 72 is fixed to the elevator car 50. The upper assembling member 71 and the lower assembling member 72 are disposed on the same horizontal plane, the upper and lower assembling member 71, 72 are formed with a first inserting hole 711 and a second inserting hole 721, respectively. The power source 73 of the assembling device 70 is only connected to the central shaft 731 and can control retraction and extension of the central shaft 731, so that the power source 73 can drive the central shaft 731 to insert into the first and second inserting holes 711, 721, respectively, and thus the elevator car 50 is connected to the suspension rack 62.

It is understood from the above description that the driving shaft assembly of the double screw elevator in accordance with the present invention consists of two screws whose helical threads extend in opposite helical directions, and each of the screws is provided with a nut, so that the suspension unit 60 and the carrying unit 40 on the nuts can be driven to move close to or away from each other, thus achieving the function of lifting or lowering the elevator car. The double screw elevator in accordance with the present invention is simply structured, easy to assemble, and the length of a single screw of the elevator is shortened, making it easier to manufacture the screw. Furthermore, the screw driving elevator reduces the occurrence of accident whiling improving the rate of utilization.

While we have shown and described various embodiments in accordance with the present invention, it is clear to those skilled in the art that further embodiments may be made without departing from the scope of the present invention.

What is claimed is:

1. A double screw elevator, comprising:
   a double screw driving unit including a driving shaft assembly connected to a rotation power source, the driving shaft assembly being provided on an outer surface thereof with a first helical thread and a second helical thread in such a manner that the first helical thread and the second helical thread extend in opposite helical directions, the rotation power source is connected to the driving shaft assembly for driving the driving shaft assembly to rotate;
   a limit rail disposed in parallel to the driving shaft assembly;
   a carrying unit including a nut fixed to one side of a carrying seat, the nut being screwed with the first thread, while another side of the carrying seat being slidably received in the limit rail;
   an elevator car detachably disposed on the carrying seat of the carrying unit;
   a suspension unit including another nut fixed to one side of a suspension rack, the another nut of the suspension unit being screwed with the second thread, and another side of the suspension rack being slidably received in the limit rail; and
   an assembling device; including an upper assembling member, a lower assembling member and a power source assembly, the upper assembling member being fixed to the suspension rack, the lower assembling member being fixed to the elevator car and located under the upper assembling member;

wherein the power source assembly includes a power source which includes a retractable central shaft with one end connected to an assembling portion, the assembling portion includes a first shaft and a second shaft, the upper assembling member is formed with a first inserting hole for insertion of the first shaft, while the lower assembling member is formed with a second inserting hole for insertion of the second shaft, when the power source pushes the retractable central shaft to an extended position, the first shaft and the second shaft will be inserted into the first and second inserting holes, respectively, so as to connect the elevator car to the suspension rack.

2. The double screw elevator car as claimed in claim 1, wherein the driving shaft assembly includes a first screw and a second screw which are connected by a connecting rod, the first screw and the second screw are formed with the first helical thread and the second helical thread, respectively, and the rotation power source is connected to one end of the first screw.

3. The double screw elevator car as claimed in claim 1, wherein a limit member is disposed at the another side of the carrying seat and slidably received in the limit rail.

4. The double screw elevator car as claimed in claim 3, wherein the limit member is a roller.

5. The double screw elevator car as claimed in claim 1, wherein a limit member is disposed at the another side of the suspension rack and slidably received in the limit rail.

6. The double screw elevator car as claimed in claim 5, wherein the limit member is a roller.

7. A double screw elevator comprising:
   a double screw driving unit including a driving shaft assembly connected to a rotation power source, the driving shaft assembly being provided on an outer surface thereof with a first helical thread and a second helical thread in such a manner that the first helical thread and the second helical thread extend in opposite helical directions, the rotation power source is connected to the driving shaft assembly for driving the driving shaft assembly to rotate;
   a limit rail disposed in parallel to the driving shaft assembly;
   a carrying unit including a nut fixed to one side of a carrying seat, the nut being screwed with the first thread of the first screw, while another side of the carrying seat being slidably received in the limit rail;
   an elevator car detachably disposed on the carrying seat of the carrying unit;
   a suspension unit including another nut fixed to one side of a suspension rack, the another nut of the suspension unit being screwed with the second thread of the second screw, and another side of the suspension rack being slidably received in the limit rail; and
   an assembling device including an upper assembling member, a lower assembling member and a power source assembly, the upper assembling member being fixed to the suspension rack, the lower assembling member being fixed to the elevator car and located under the upper assembling member;

wherein the power source assembly includes a power source with a retractable central shaft, the upper assembling member and the lower assembling member are disposed on the same horizontal plane, the upper assembling member is formed with a first inserting hole, while the lower assembling member is formed with a second inserting hole, when the power source pushes the retractable central shaft to an extended position, the retractable central shaft will be inserted into the first and second inserting holes to connect the elevator car to the suspension rack.

* * * * *